United States Patent [19]

Choi

[11] Patent Number: 5,800,307
[45] Date of Patent: Sep. 1, 1998

[54] SYSTEM AND METHOD FOR CONTROLLING GEAR SHIFTING OF AUTOMATIC TRANSMISSION VEHICLES, IMPROVING DAMPING FORCE

[75] Inventor: Kyeongnam Choi, Seoul, Rep. of Korea

[73] Assignee: Hyundai Motor Company, Seoul, Rep. of Korea

[21] Appl. No.: 777,440

[22] Filed: Dec. 30, 1996

[30] Foreign Application Priority Data

Dec. 30, 1995 [KR] Rep. of Korea ............ 95-68306

[51] Int. Cl.$^6$ ................................. F16H 59/54
[52] U.S. Cl. ................................. 477/94; 477/96
[58] Field of Search ............. 477/94, 95, 96

[56] References Cited

U.S. PATENT DOCUMENTS 5,025,684  6/1991  Stehle et al. ................. 477/94
5,048,650  9/1991  Takizawa ................. 477/95

*Primary Examiner*—Dirk Wright
*Attorney, Agent, or Firm*—Christie, Parker & Hale, LLP

[57] ABSTRACT

A system and a method for controlling gear shifting of automatic transmission vehicles, the system including a timer providing a timing signal, a vehicle speed sensor converting a vehicle speed to an electric signal and outputting the signal after detecting the vehicle speed, a throttle position sensor converting a throttle valve opening to an electric signal and outputting the signal after detecting a throttle valve opening, an accelerator switch for determining whether an accelerator pedal is pressed, a brake switch for determining whether a brake pedal is pressed, a microcontroller responsive to signals from the vehicle speed sensor and the throttle position sensor and having a control signal to prevent upshift if a driver presses the brake pedal after a predetermined time has lapsed, the time which is from the driver's release of the accelerator pedal in a condition of upshift. This improves damping force and provides for easy braking by preventing upshift when the system detects that the driver presses the brake pedal after a lapse of a predetermined time from releasing the accelerator pedal, even under the condition of shifting from low gear to high gear.

6 Claims, 2 Drawing Sheets

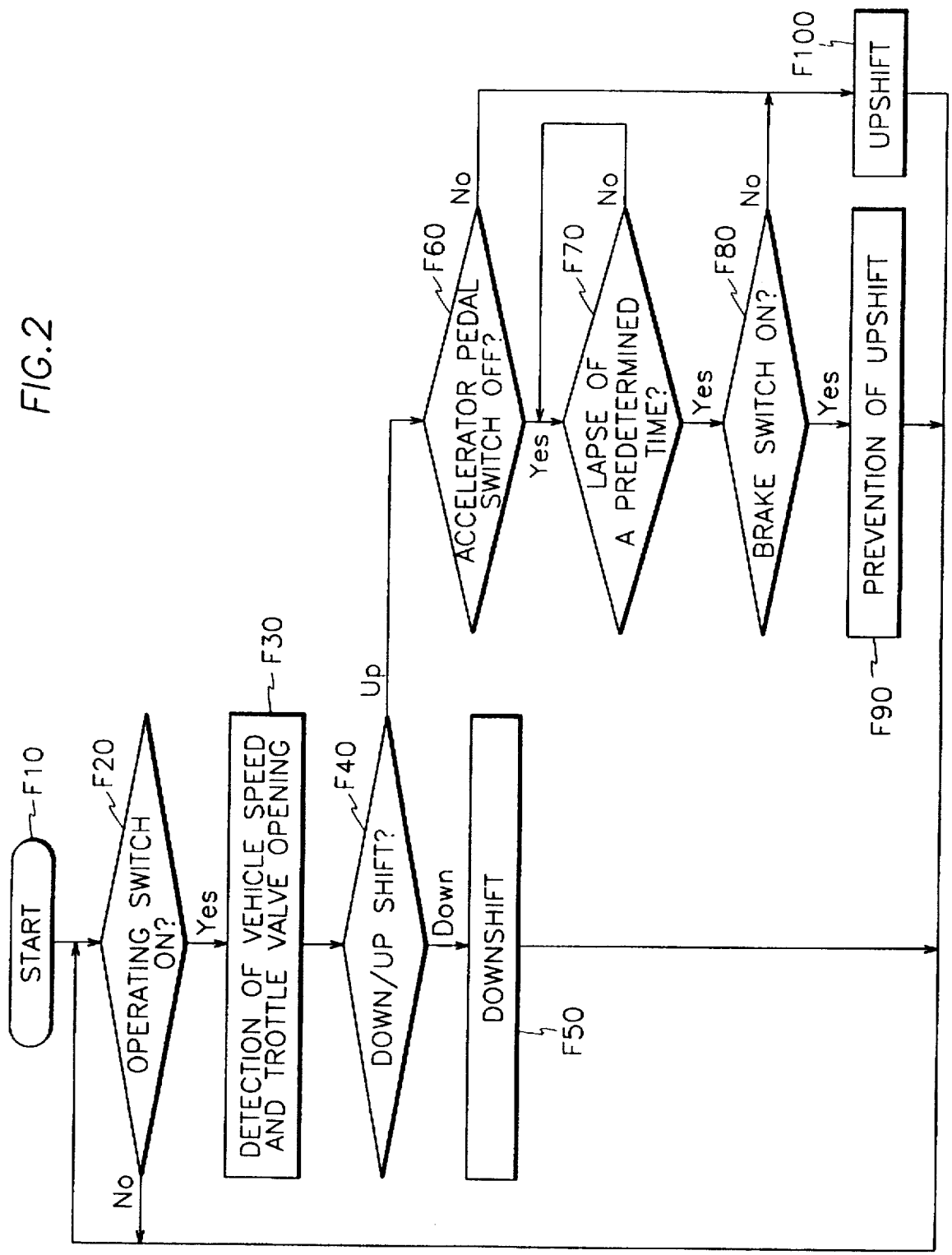

SYSTEM AND METHOD FOR CONTROLLING GEAR SHIFTING OF AUTOMATIC TRANSMISSION VEHICLES, IMPROVING DAMPING FORCE

BACKGROUND OF THE INVENTION

The present invention relates to a system and a method for controlling gear shifting of automatic transmission vehicles, improving damping force, and more particularly to a system and a method for controlling gear shifting of automatic transmission vehicles, improving damping force and easy braking by preventing upshift when the system detects that the driver presses the brake pedal after a lapse of a predetermined time from releasing the accelerator pedal, even under the condition of shifting from low gear to high gear.

Generally, it is difficult for drivers, especially for beginners, to handle a clutch pedal, an accelerator pedal, a gear shifting lever, etc., simultaneously and it usually takes a lot of time to become skilled in handling a vehicle with a manual transmission.

Also, skilled drivers get tired with frequent operation in case of long-distance driving or when they pass through an urban district area with heavy traffic.

The automation to mechanically operate a clutch pedal and a gear selection and shift decisions have been realized by an automatic transmission. The automatic transmission enables drivers to take an easy drive while operating only an accelerator pedal and a brake pedal.

In vehicles with automatic transmissions, gear shifting occurs in accordance with a throttle valve opening and the vehicle speed. When driving with a constant throttle valve opening, shifting gears from low to high (i.e., upshift) occurs during acceleration, while shifting gears from high to low (i.e. downshift) occurs during deceleration.

In conventional automatic transmission vehicles, however, there is a defect in that once a driver presses the accelerator pedal, shifting gears from low to high occurs regardless of the driver's intention even when the driver subsequently releases the accelerator pedal for deceleration.

Therefore, the result being more time and greater distance required to brake the vehicle. This increases the chance for accidents, and exposes brake pads to relatively easy abrasion.

SUMMARY OF THE INVENTION

It is therefore an objective of the present invention to overcome the above-described prior art drawbacks and to provide a system and a method for controlling gear shifting of automatic transmission vehicles that realizes easy braking by preventing upshift when a driver presses a brake pedal, after a lapse of a predetermined time from the driver's release of an accelerator pedal, even under the shifting condition from low to high gear, improving damping force as well.

To achieve this objective, the system according to the present invention, includes a timer having a predetermined time. A vehicle speed sensor is used to detect the vehicle speed. A throttle position sensor is used to detect the throttle valve opening. An accelerator switch is connected to the accelerator pedal, and a brake switch is connected to the brake pedal. A microcontroller responsive to the vehicle speed sensor and the throttle position sensor outputs a control signal to prevent upshift if a driver presses a brake pedal in an upshift condition, after a lapse of the predetermined time from the driver releasing the accelerator pedal, using signals inputted from the accelerator pedal switch, the brake switch and the timer. A shift operating part provides gears shifting according to the control signals inputted from the microcontroller.

The system in accordance with the present invention may be further provided with an operating switch to optionally operate the gear shifting control system.

To achieve the above objective, the method of the present invention is implemented by starting operation when electricity is applied. The position of an operating switch is determined from the operating switch after initializing all memory variables. Next, a downshift/upshift condition is determined on the basis of the vehicle speed and the throttle valve opening when the operating switch is on. If a downshift condition is detected, the transmission is downshifted according to a shift pattern.

Conversely, if an upshift condition is detected, it is determined whether the predetermined time has lapsed by using the timer when the accelerator pedal is released. The upshift of the transmission is inhibited when the brake pedal is depressed when the predetermined time has lapsed. If the accelerator pedal is depressed or the brake pedal is not depressed after release of the acceleration pedal, the transmission is shifted up according to a shift pattern.

BRIEF DESCRIPTION OF THE DRAWINGS

Further objectives and other advantages of the present invention will become apparent from the following description in conjunction with the attached drawings, in which:

FIG. 2 is an operating flowchart of a gear shifting control method for automatic transmission vehicles, improving damping force, in accordance with a preferred embodiment of the present invention.

DETAILED DESCRIPTION

Figure 1:
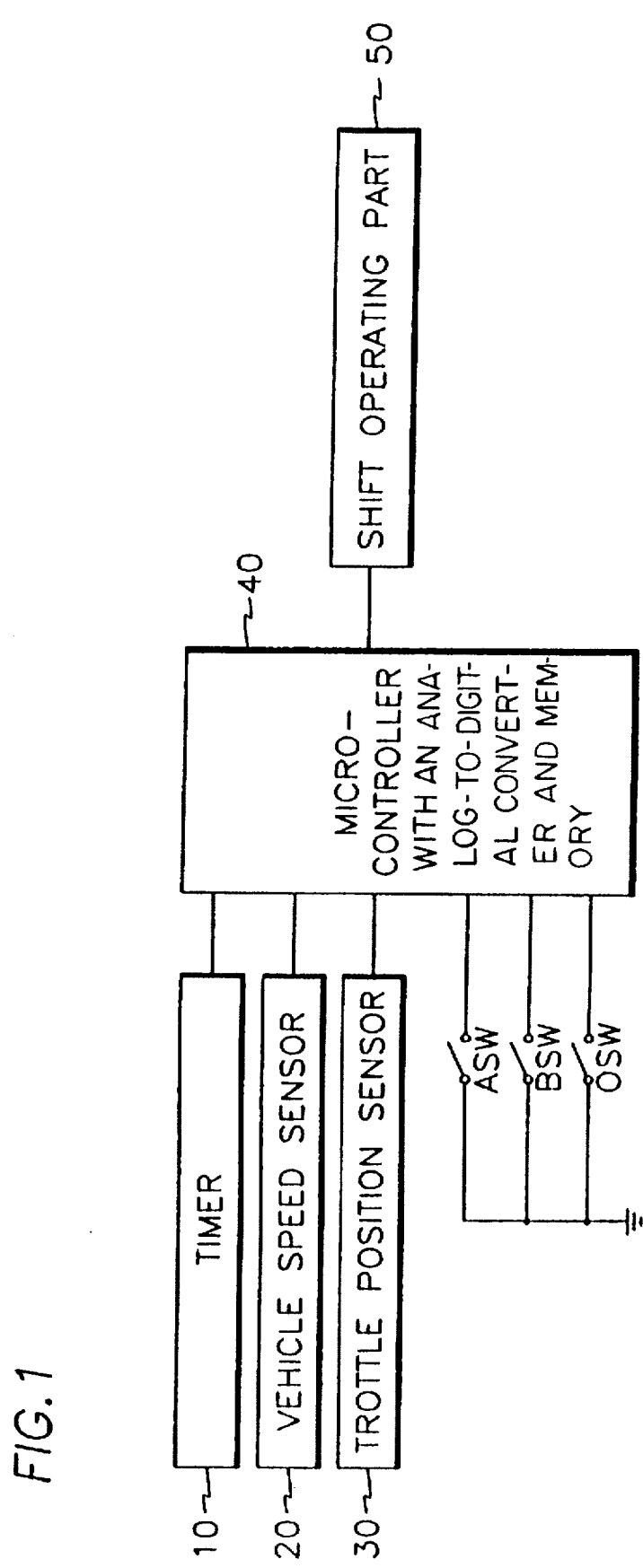
FIG. 1 is a block diagram of a gear shifting control system for automatic transmission vehicles, improving damping force, in accordance with a preferred embodiment of the present invention.

FIG. 1 illustrates a block diagram for a system for controlling gear shifting of automatic transmission vehicles, improving damping force, in accordance with a preferred embodiment of the present invention.

As shown in FIG. 1, the system comprises a timer 10 having a predetermined timing signal. A vehicle speed sensor 20 is employed to convert the vehicle speed to an electric signal, and a throttle position sensor 30 is also used to convert a throttle valve opening to an electric signal. An accelerator pedal switch (ASW) is connected to the accelerator pedal, and a brake switch (BSW) is connected to the brake pedal. An operating switch (OSW) is employed to optionally operate the gear shifting control system. A microcontroller 40, the input end of which is connected with output ends of the timer 10, the vehicle speed sensor 20, the throttle position sensor 30, the accelerator pedal switch (ASW), the brake switch (BSW), and the operating switch, respectively, has a control output connected to a shift operating part.

Preferably, the microcontroller 40 is provided with an analog to digital converter and a memory.

FIG. 2, illustrates an operating flowchart of the gear shifting control method in accordance with a preferred embodiment of the present invention.

As shown in FIG. 2, the gear shifting control method is initiated when electricity is applied (F10). A determination whether an operating switch is on is made by reading a signal inputted from the operating switch after initializing all memory variables (F20). The vehicle speed and the throttle valve opening is detected when the operating switch is on, and a signal corresponding thereto is outputted (F30). A determination is made as to whether the vehicle is in a downshift condition or an upshift condition in response to the signals (F40). The transmission is shifted down according to a predetermined shift pattern under a downshift condition (F50). Alternatively, the transmission is shifted up according to a predetermined shift pattern (F100) if the accelerator pedal is pressed when the vehicle is in the upshift condition (F60). However, if the acceleration pedal is released during the upshift condition, a predetermined time, from the time that the accelerator pedal is released, is measured. Once the predetermined time has lapsed, a determination is made whether the brake pedal is depressed (F80). The upshifting of the transmission is inhibited when the brake pedal is depressed (F90). Conversely, the transmission is upshifted according to a shift pattern when the brake pedal is not depressed (F100).

With the above-described embodiment, the operation of a system and a method for controlling gear shifting of automatic transmission vehicles, improving damping force, in accordance with a preferred embodiment of the present invention will now be described hereinafter.

When electricity is applied, a system and a method for controlling gear shifting of automatic transmission vehicles, improving damping force, is initiated by a microcontroller in accordance with the operating flowchart in FIG. 2. The program for executing this operation is stored in memory of the microcontroller 40.

When operations start, the microcontroller 40 determines that an operating switch (OSW) is on by reading signals inputted from the operating switch after initializing all memory variables.

When the operating switch (OSW) is on, the microcontroller 40 detects (F30) the current vehicle speed and the throttle valve opening by reading signals inputted from a vehicle speed sensor 20 and a throttle position sensor 30, and outputs corresponding signals thereto.

Then, the microcontroller 40 determines (F40), by using the shift pattern in memory, whether the vehicle is in a downshift condition or an upshift condition in response to the signals.

Under the downshift condition, the microcontroller 40 outputs (F50) a control signal to the shift operating part 50 such that shifting down is performed according to the shift pattern.

However, under the upshift condition, the microcontroller 40 determines (F60), by reading a signal inputted from an accelerator pedal switch (ASW), if the accelerator pedal is depressed, and if so, upshifts according to a predetermined shift pattern (F100).

Conversely, if the microcontroller determines that the accelerator pedal is released by reading the signal inputted from the acceleration pedal switch (ASW), the microcontroller 40 determines, by using the timer 10, whether a predetermined time from the time the accelerator pedal is released, has lapsed (F70). Preferably, the predetermined time is a very short period.

The microcontroller 40 determines, (F80) by reading a signal inputted from the brake switch (BSW), whether the brake pedal is depressed when the predetermined time has lapsed.

When the brake pedal is determined to be depressed, the microcontroller 40 prevents (F90) an upshift by outputting a control signal to the shift operating part 50 to raise the damping force, deciding that the driver intends to brake.

In the above case, the reason for determining the lapse of a predetermined time from the time that the accelerator pedal is released, is to prevent upshift where a driver habitually puts his or her foot, with no intention of braking, on a brake pedal right after releasing the accelerator pedal.

If the accelerator pedal is depressed or the brake pedal is not determined to be depressed despite the release of the accelerator pedal under the condition of upshift, the microcontroller 40 outputs a control signal to the shift operating part such that shifting up is performed according to the shift pattern.

In this preferred embodiment, therefore, the present invention provides a system and a method for controlling gear shifting of automatic transmission vehicles, improving damping force, by preventing upshift when the system detects that the driver presses the brake pedal after a lapse of a predetermined time from releasing the accelerator pedal, even where a condition for shifting gears from low to high is achieved.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for controlling gear shifting of an automatic transmission in a vehicle having an accelerator pedal and a brake pedal, comprising:

a vehicle speed sensor for detecting a speed of the vehicle;

a throttle position sensor for detecting an opening of a throttle valve;

an accelerator pedal switch for indicating when the accelerator pedal is released;

a brake switch for indicating when the brake pedal is pressed;

a microcontroller having a control signal output for upshifting the transmission, said control signal being responsive to said vehicle speed sensor and said throttle position sensor, said control signal inhibiting the upshift when said brake switch indicates that the brake pedal is pressed after a predetermined time from the time the acceleration pedal switch indicates said accelerator pedal is released; and a shift operating part responsive to said control signal.

2. The system for controlling gear shifting of an automatic transmission of a vehicle of claim 1 further comprising an operating switch connected to said microcontroller.

3. The system for controlling gear shifting of an automatic transmission of a vehicle of claim 1 wherein said microcontroller comprises an analog to digital converter and a memory.

4. A method for controlling gear shifting of an automatic transmission of a vehicle, comprising the steps of:

determining whether an operating switch is on;

detecting both a speed and a throttle valve opening of the vehicle when the operating switch is on, and outputting corresponding signals thereto;

determining whether the vehicle is in an upshift condition in response to the signals;

determining if an accelerator pedal of the vehicle is depressed when the vehicle is in the upshift condition;

shifting up according to a predetermined shift pattern when the accelerator pedal is depressed or determining, when the accelerator pedal is not depressed, whether a predetermined time, from the time that the accelerator pedal is released, has lapsed;

determining whether a brake pedal of the vehicle is depressed when the predetermined time has lapsed; and preventing shifting up when the brake pedal is determined to be depressed or shifting up according to a shift pattern when the brake pedal is determined not to be depressed.

5. The system for controlling gear shifting of an automatic transmission of a vehicle of claim 1 further comprising a timer connected to said microcontroller, the predetermined time being generated by said timer.

6. The system for controlling gear shifting of an automatic transmission of a vehicle of claim 1 wherein the control signal for upshifting the transmission is output by said microcontroller under a stable condition.

* * * * *